US009665938B2

(12) United States Patent
Harada et al.

(10) Patent No.: US 9,665,938 B2
(45) Date of Patent: May 30, 2017

(54) IMAGE PROCESSING APPARATUS AND SPECIFIC FIGURE DETECTING METHOD

(71) Applicant: KYOCERA Document Solutions Inc., Osaka (JP)

(72) Inventors: Hiroyuki Harada, Osaka (JP); Hironori Hayashi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/104,967

(22) PCT Filed: Dec. 22, 2014

(86) PCT No.: PCT/JP2014/083857
§ 371 (c)(1),
(2) Date: Jun. 15, 2016

(87) PCT Pub. No.: WO2015/098810
PCT Pub. Date: Jul. 2, 2015

(65) Prior Publication Data
US 2016/0321813 A1 Nov. 3, 2016

(30) Foreign Application Priority Data
Dec. 27, 2013 (JP) .................................. 2013-271374

(51) Int. Cl.
G06K 9/62 (2006.01)
G06T 7/00 (2017.01)
G06T 7/73 (2017.01)

(52) U.S. Cl.
CPC .......... *G06T 7/0044* (2013.01); *G06K 9/6202* (2013.01); *G06T 7/74* (2017.01)

(58) Field of Classification Search
None
See application file for complete search history.

(56) References Cited

U.S. PATENT DOCUMENTS

2002/0041698 A1    4/2002   Ito
2004/0028258 A1*   2/2004   Naimark .............. G06K 9/4609
                                                    382/103
(Continued)

FOREIGN PATENT DOCUMENTS

JP    H11-265282    9/1999
JP    2002-158999   5/2002
(Continued)

OTHER PUBLICATIONS

Kasuhisa Shiiya and Shigenobu Ishigaki, "A Study of Circular Road Sign Recognition from a Color Image", IEICE Technical Report ITS2009-19(Dec. 2009), The Institute of Electronics, Information and Communication Engineers.

*Primary Examiner* — Randolph I Chu

(57) ABSTRACT

A binarization processing unit 11 performs a binarization process the basis of existence of at least one of lightness and chroma for a candidate image of template matching. A labeling processing unit 12 performs a labeling process for the binarized candidate image and thereby extracts a pixel block in the binarized candidate image. An outline determining unit 14 performs sampling of a position on an outermost periphery of the pixel block, and identifies a range from a centroid position of the pixel block and an angle from a predetermined direction as the position. A correlation determining unit 15 determines a correlation between the ranges and the angles of both the candidate image and the reference image on the basis of the reference outline data, and excludes the candidate image from a candidate of the template matching in accordance with degree of the correlation.

6 Claims, 3 Drawing Sheets

(56) References Cited

U.S. PATENT DOCUMENTS

| | | | |
|---|---|---|---|
| 2007/0269079 A1* | 11/2007 | Taniguchi | G06K 9/00369 382/104 |
| 2008/0130954 A1* | 6/2008 | Taniguchi | G06K 9/00805 382/104 |
| 2010/0110374 A1* | 5/2010 | Raguin | A61B 3/1216 351/206 |
| 2011/0234840 A1* | 9/2011 | Klefenz | G06K 9/00375 348/222.1 |
| 2012/0092483 A1 | 4/2012 | Sugiyama et al. | |
| 2012/0300996 A1* | 11/2012 | Nakamura | G06K 9/0014 382/128 |

FOREIGN PATENT DOCUMENTS

| | | |
|---|---|---|
| JP | 2003-123080 | 4/2003 |
| JP | 2013-161241 | 8/2013 |

* cited by examiner

CONNECTING
POSITION

IMAGE PROCESSING APPARATUS AND SPECIFIC FIGURE DETECTING METHOD

TECHNICAL FIELD

The present invention relates to an image processing apparatus and a specific figure detecting method.

BACKGROUND ART

Recently, it is deeply wished to detect a full-color logo in a document image. In case of a logo including a figure, it can not be detected using an OCR (Optical Character Recognition) technique, and therefore it is detected using a pattern matching technique. In such a pattern matching technique, matching degree between a reference image and a target image (for example, see PATENT LITERATURE #1).

CITATION LIST

Patent Literature

PATENT LITERATURE #1: Japanese Patent Application Publication No. 2007-79982.

SUMMARY OF INVENTION

Technical Problem

However, since a logo in a document image is included in various situation of its size, its rotation angle and the like, it is not easy to quickly detect such a logo (in particular, a full-color logo) using template matching.

The present invention has been made in view of the aforementioned problem. It is an object of the present invention to achieve an image processing apparatus and a specific figure detecting method quickly detecting a logo in a document image using template matching.

Solution to Problem

An image processing apparatus according to the present invention includes: a binarization processing unit that performs a binarization process on the basis of existence of at least one of lightness and chroma for a candidate image of template matching; a labeling processing unit that performs a labeling process for the binarized candidate image and thereby extracts a pixel block in the binarized candidate image; an outline determining unit that performs sampling of a position in coordinates on an outermost periphery of the pixel block, and identifies a range from a centroid position of the pixel block and an angle from a predetermined direction as the position in coordinates; a storage device that stores reference outline data obtained by performing the binarization process, the labeling process, and the outline determination process for a reference image of template matching; a correlation determining unit that determines a correlation between (a) the range and the angle of the candidate image and (b) a range and an angle of a position on an outermost periphery of a pixel block in the reference image on the basis of the reference outline data, and excludes the candidate image from a candidate of the template matching in accordance with degree of the determined correlation; and a template matching unit that performs template matching between the reference image and the candidate image that is not excluded by the correlation determining unit and does not perform template matching between the reference image and the candidate image that is excluded by the correlation determining unit.

A specific figure detecting method according to the present invention includes the steps of: performing a binarization process on the basis of existence of at least one of lightness and chroma for a candidate image of template matching; performing a labeling process for the binarized candidate image and thereby extracting a pixel block in the binarized candidate image; performing sampling of a position in coordinates on an outermost periphery of the pixel block, and identifying a range from a centroid position of the pixel block and an angle from a predetermined direction as the position in coordinates; determining a correlation between (a) the range and the angle of the candidate image and (b) a range and an angle of a position on an outermost periphery of a pixel block in a reference image on the basis of reference outline data, and excluding the candidate image from a candidate of the template matching in accordance with degree of the determined correlation, the reference outline data obtained by performing the binarization process, the labeling process, and the outline determination process for the reference image of template matching; and performing template matching between the reference image and the candidate image that is not excluded by the correlation determining unit without performing template matching between the reference image and the candidate image that is excluded by the correlation determining unit.

Advantageous Effect of Invention

According to the present invention, quickly detecting a logo in a document image is enabled using pattern matching.

DESCRIPTION OF EMBODIMENTS

Hereinafter, an embodiment of the present invention will be explained with reference to drawings.

Figure 1:
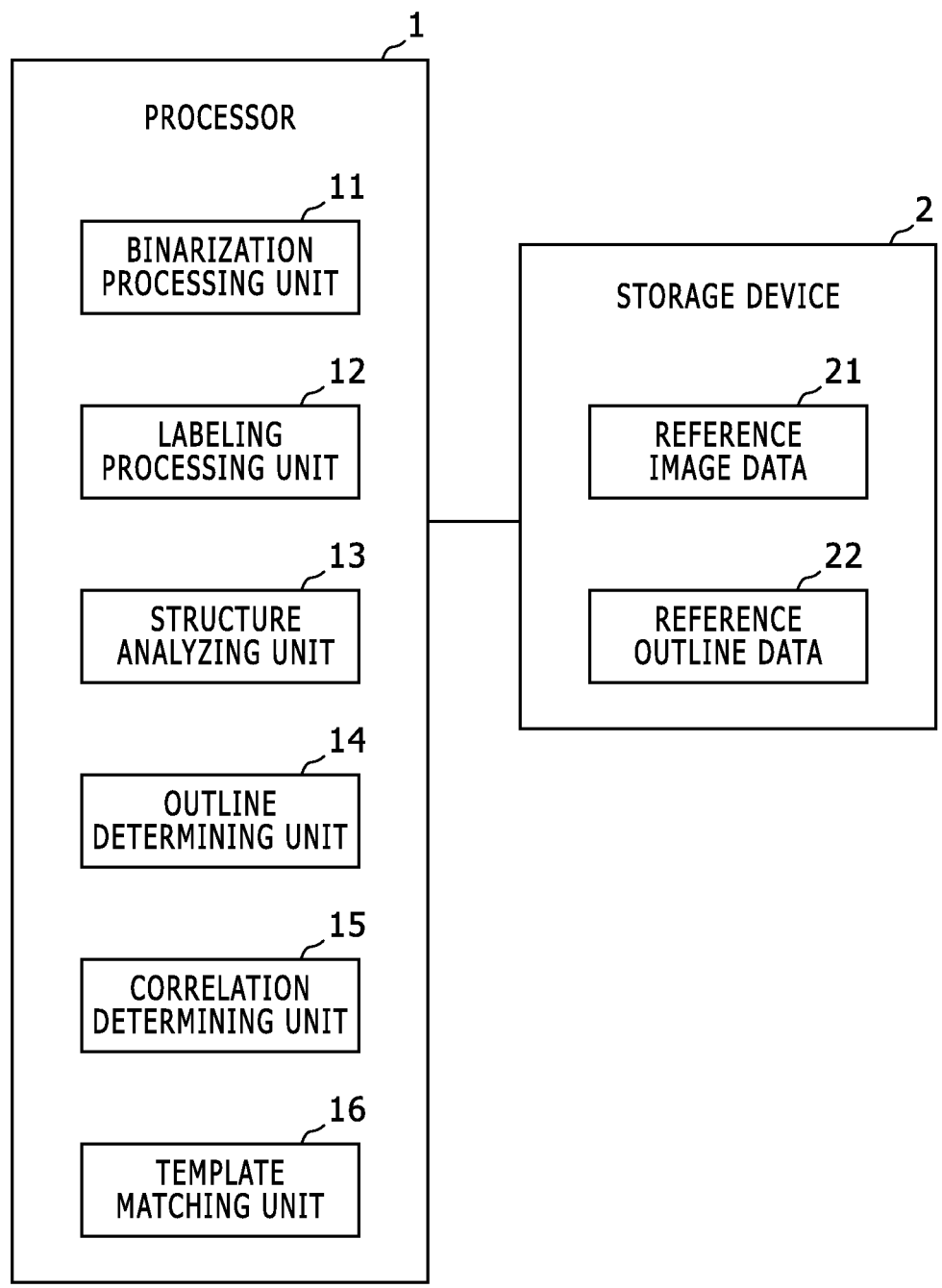
FIG. 1 shows a block diagram that indicates a configuration of an image processing apparatus according to an embodiment of the present invention.

FIG. 1 shows a block diagram that indicates a configuration of an image processing apparatus according to an embodiment of the present invention. The image processing apparatus includes a processor 1 and a storage device 2. The processor 1 includes, for example, a computer or the like and acts as sorts of processing units. The storage device 2 is a non volatile storage device and stores sorts of data.

The processor 1 acts as a binarization processing unit 11, a labeling processing unit 12, a structure analyzing unit 13, an outline determining unit 14, a correlation determining unit 15, and a template matching unit 16. In the storage device 2, reference image data 21 and reference outline data 22 are stored.

The binarization processing unit 11 performs a binarization process on the basis of existence of at least one of lightness and chroma for a reference image and a candidate image of template matching. Specifically, on each pixel, the binarization processing unit 11 sets a binarized value as 1 if at least one of lightness and chroma exists and sets a binarized value as 0 if none of lightness and chroma exists.

The template matching is performed between the reference image and the candidate image, and the candidate image that agrees with the reference image is detected. Here the reference image is a logo including a figure (a logo of a company or the like), and the candidate image is extracted from a document image by removing a character and a ruled line and the like. Otherwise, as the candidate image, extracted is an image part including a composing color of the reference image or a similar color within a predetermined range from the composing color.

The labeling processing unit 12 performs a labeling process for the binarized reference image and the binarized candidate image and thereby extracts one or plural pixel blocks (i.e. a set of pixels to which the same label is attached) in the binarized reference image and one or plural pixel blocks in the binarized candidate image.

Here the labeling processing unit 12 performs a sharpening process and thereby extracts an edge in the image and determines the pixel block. In addition, the labeling processing unit 12 may performs the sharpening process after a smoothing process for the binarized reference image and the binarized candidate image and thereby may remove a noise or screen dots.

The structure analyzing unit 13 determines whether the number of pixel blocks before an expanding process or a shrinking process and the number of pixel blocks after the expanding process or the shrinking process are different from each other in the binarized reference image or not using the labeling processing unit 12.

If the structure analyzing unit 13 determines that the number of pixel blocks before an expanding process or a shrinking process and the number of pixel blocks after the expanding process or the shrinking process are different from each other in the binarized reference image, then the labeling processing unit 12 performs the labeling process after performing the expanding process for the binarized candidate image. Thus, if two pixel blocks are close to each other and the two pixel blocks are combined by the expanding process, then the two pixel blocks are recognized as one pixel block.

Figure 2A:
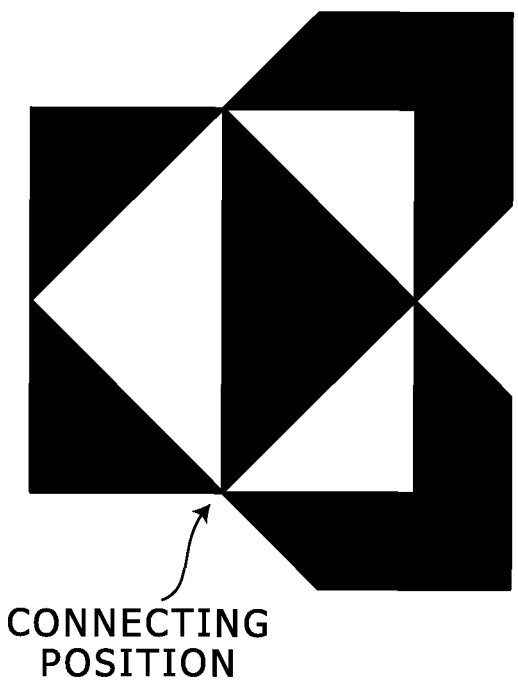
FIG. 2A shows a diagram that explains an outline determination process in the image processing apparatus shown in FIG. 1 (1/2)
Figure 2B:
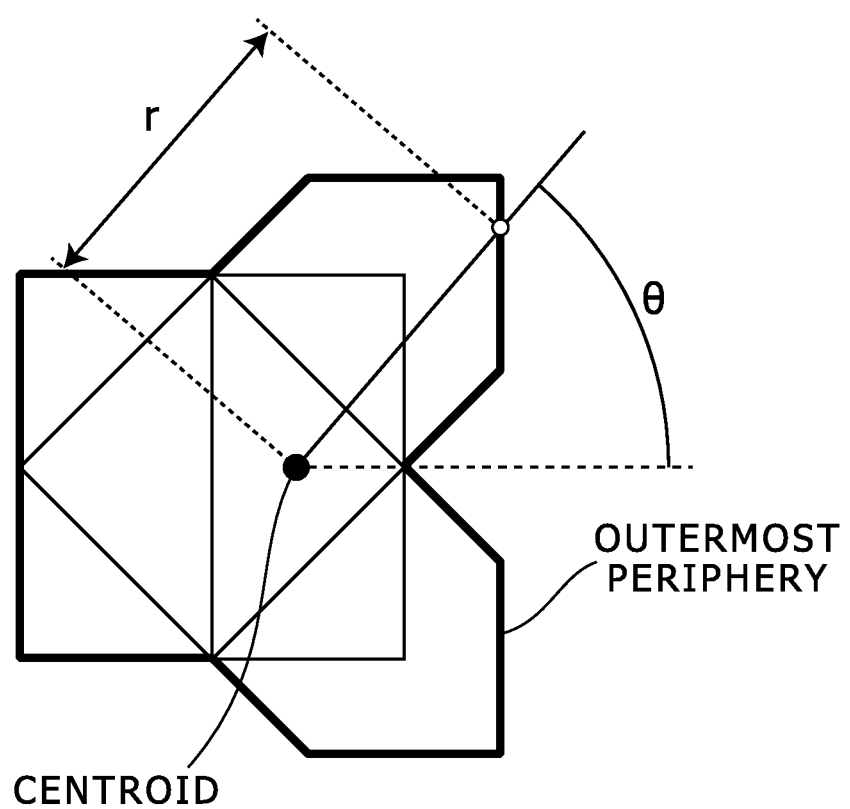
FIG. 2B shows a diagram that explains an outline determination process in the image processing apparatus shown in FIG. 1 (2/2).

FIGS. 2A and 2B show diagrams that explain an outline determination process in the image processing apparatus shown in FIG. 1. The outline determining unit 14 performs an outline determination process that (a) performs sampling of a position in coordinates on an outermost periphery of a pixel block in the reference image and the candidate image at each angle changed by a predetermined angle (e.g. 1 degree), and (b) identifies a range r from a centroid position of the pixel block and an angle θ from a predetermined direction as the position (r, θ) in coordinates.

Further, the reference image data 21 is image data of the reference image, and the reference outline data 22 is data obtained by the binarization process, the labeling process, and the outline determination process for the reference image of template matching.

The correlation determining unit 15 determines a correlation between (a) the range and the angle (r, θ) of the candidate image and (b) the range and the angle (r, θ) of the reference image on the basis of the reference outline data 22, and excludes the candidate image from a candidate of the template matching in accordance with degree of the determined correlation.

In this process, while the characteristic is rotated in a range from 0 degrees to 359 degrees, the degree of the correlation between the both is determined in turn. In this manner, if the candidate image is the same as the rotated reference image, the candidate image is not excluded.

If the candidate image is the reference image changed in size, the (r, θ) characteristic of the candidate image and the (r, θ) characteristic of the reference image have mathematical similarity to each other, and therefore such candidate image is not excluded.

Here the reference image is a logo including a figure, and if the logo is a figure with n times rotational symmetry (n>1), then the correlation determining unit 15 rotates a relative position in one from the other among a characteristic of the range and the angle (i.e. a characteristic of the range r to the angle θ when moving a position along the outermost periphery) of the candidate image and a characteristic of the range and the angle of the reference image within an angle range corresponding to the aforementioned n, and thereafter determines the correlation.

Thus if the logo is not a figure with rotational symmetry, then the degree of the correlation between them is determined with the characteristic rotated in a range from 0 to 359 degrees. Contrarily, if the logo is a figure with n times rotational symmetry, then the degree of the correlation between them is determined with the characteristic rotated in a range from 0 to (360/n−1) degrees.

The correlation determining unit 15 may compare an aspect ratio of the candidate image with an aspect ratio of the reference image, and may exclude the candidate image from a candidate of the template matching in accordance with the comparison result. For example, if a difference between the aspect ratios of them is equal to or larger than a predetermined threshold value, then the candidate image is excluded from a candidate of the template matching.

The template matching unit 16 performs template matching between the reference image and the candidate image that is not excluded by the correlation determining unit 15 on the basis of the reference image data 21 and image data of the candidate image, and does not perform template matching between the reference image and the candidate image that is excluded by the correlation determining unit 15. In the template matching, pixel by pixel, a pixel value of the reference image based on the reference image data 21 and a pixel value of the candidate image are compared with each other, and it is determined whether the reference image and the candidate image agrees with each other or not on the basis of the comparison results.

If the candidate image is the same as the reference image changed in size, the correlation determining unit 15 calculates a ratio (i.e. a zooming ratio) between sizes of the candidate image and the reference image based on (r,θ) characteristics of the candidate image and the reference image. The template matching unit 16 zooms the candidate image or the reference image on the basis of the zooming ratio so as to get the same sizes of the candidate image and the reference image as each other, and thereafter performs the template matching.

The following part explains a behavior of the aforementioned image processing apparatus.

Firstly, a user prepares reference image data 21 of a desired reference image and the reference image data 21 is stored in the storage device. For example, the reference image data 21 may be generated by CAD (Computer Aided Design) or may be generated by causing a scanner to scan a document on which the reference image has been printed. Subsequently, the binarization processing unit 11, the labeling processing unit 12, the structure analyzing unit 13, and the outline determining unit 14 generate reference outline data 22 from the reference image data 21 and store the reference outline data 22 in the storage device 2.

Afterward, when a candidate image for template matching is obtained from a document image scanned by a scanner for example, the binarization processing unit 11 performs the binarization process for the candidate image.

Subsequently, the labeling processing unit 12 performs the labeling process for the candidate image binarized by the binarization processing unit 11, and thereby extracts one or plural pixel blocks.

In addition, here the structure analyzing unit 13 performs an expanding process (a process that expands an outermost periphery of each pixel block) or a shrinking process (a process that shrinks an outermost periphery of each pixel block) for the binarized reference image, and determines whether the number of pixel blocks before the expanding process or the shrinking process and the number of pixel blocks after the expanding process or the shrinking process are different from each other in the binarized reference image or not using the labeling processing unit 12. For example, at a connecting position as shown in FIG. 2A, the expanding process makes connection and the shrinking process makes disconnection.

If the structure analyzing unit 13 determines that the number of pixel blocks before the expanding process or the shrinking process and the number of pixel blocks after the expanding process or the shrinking process are different from each other in the binarized reference image, then the labeling processing unit 12 performs the labeling process after performing the expanding process for the binarized candidate image.

Therefore, even if plural pixel blocks are detected as separated from each other at a connecting position as shown in FIG. 2A, the labeling process is performed for one pixel block as shown in FIG. 2B.

Subsequently, the outline determining unit 14 performs the outline determination process to obtain outline data of the candidate image (i.e. the aforementioned sampling data of the positions in coordinates $(r, \theta)$ on the outermost periphery).

Subsequently, the correlation determining unit 15 determines a correlation coefficient between the positions in coordinate $(r, \theta)$ of the both images on the basis of outline data of the candidate image and the reference outline data 22, and excludes the candidate image from a candidate of the template matching if the determined correlation coefficient of the candidate image is less than a predetermined threshold value.

The template matching unit 16 performs template matching between the reference image and the candidate image that is not excluded by the correlation determining unit 15 on the basis of the reference image data 21 and image data of the candidate image, and does not perform template matching between the reference image and the candidate image that is excluded by the correlation determining unit 15.

As mentioned, in the aforementioned embodiment, the binarization processing unit 11 performs a binarization process for a candidate image of template matching; the labeling processing unit 12 performs a labeling process for the binarized candidate image and thereby extracts a pixel block in the binarized candidate image; and the outline determining unit 14 performs an outline determination process that performs sampling of a position on an outermost periphery of the pixel block, and identifies a range from a centroid position of the pixel block and an angle from a predetermined direction as the position. The correlation determining unit 15 determines a correlation between the ranges and the angles of both the candidate image and the reference image on the basis of the reference outline data, and excludes the candidate image from a candidate of the template matching in accordance with degree of the correlation. The template matching unit 16 performs template matching between the reference image and only the candidate image that is not excluded by the correlation determining unit 15.

Thus, since a candidate image that has a completely different outline is excluded in a preprocess before template matching, the number of candidate images for which the template matching is performed is reduced and consequently a logo in a document image can be quickly detected using template matching.

It should be noted that the aforementioned description has been presented for purposes of illustration and description, and is not intended to be exhaustive nor to limit the present invention.

For example, in the aforementioned embodiment, the structure analyzing unit 13 is used. Alternatively, the outline determination process may be performed immediately after the labeling process without the structure analyzing unit 13.

Further, it should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to detection of a logo including a figure in a document image.

The invention claimed is:
1. An image processing apparatus, comprising:
a binarization processing unit that performs a binarization process on the basis of existence of at least one of lightness and chroma for a candidate image of template matching;
a labeling processing unit that performs a labeling process for the binarized candidate image and thereby extracts a pixel block in the binarized candidate image;
an outline determining unit that performs sampling of a position in coordinates on an outermost periphery of the pixel block, and identifies a range from a centroid position of the pixel block and an angle from a predetermined direction as the position in coordinates;
a storage device that stores reference outline data obtained by performing the binarization process, the labeling process, and the outline determination process for a reference image of template matching;
a correlation determining unit that determines a correlation between (a) the range and the angle of the candidate image and (b) a range and an angle of a position on an outermost periphery of a pixel block in the reference image on the basis of the reference outline data, and excludes the candidate image from a candidate of the template matching in accordance with degree of the determined correlation; and
a template matching unit that performs template matching between the reference image and the candidate image that is not excluded by the correlation determining unit and does not perform template matching between the reference image and the candidate image that is excluded by the correlation determining unit.

2. The image processing apparatus according to claim 1, wherein if the number of pixel blocks before an expanding process or a shrinking process and the number of pixel blocks after the expanding process or the shrinking process are different from each other in the binarized reference image, the labeling processing unit performs the labeling process after performing the expanding process for the binarized candidate image.

3. The image processing apparatus according to claim 1, wherein:
the reference image is a logo that includes a figure; and
if the logo is a figure with n times rotational symmetry, the correlation determining unit rotates a relative position in one from the other among a characteristic of the range and the angle of the candidate image and a characteristic of the range and the angle of the reference image within an angle range corresponding to the n, and thereafter determines the correlation.

4. The image processing apparatus according to claim 1, wherein the correlation determining unit compares an aspect ratio of the candidate image with an aspect ratio of the reference image, and excludes the candidate image from a candidate of the template matching in accordance with the comparison result.

5. The image processing apparatus according to claim 1, wherein if the candidate image is the same as the reference image changed in size, the correlation determining unit calculates as a zooming ratio a ratio between sizes of the candidate image and the reference image based on (r,θ) characteristics of the candidate image and the reference image, and the template matching unit zooms the candidate image or the reference image on the basis of the zooming ratio so as to get the same sizes of the candidate image and the reference image as each other, and thereafter performs the template matching.

6. A specific figure detecting method, comprising the steps of:
performing a binarization process on the basis of existence of at least one of lightness and chroma for a candidate image of template matching;
performing a labeling process for the binarized candidate image and thereby extracting a pixel block in the binarized candidate image;
performing sampling of a position in coordinates on an outermost periphery of the pixel block, and identifying a range from a centroid position of the pixel block and an angle from a predetermined direction as the position in coordinates;
determining a correlation between (a) the range and the angle of the candidate image and (b) a range and an angle of a position on an outermost periphery of a pixel block in a reference image on the basis of reference outline data, and excluding the candidate image from a candidate of the template matching in accordance with degree of the determined correlation, the reference outline data obtained by performing the binarization process, the labeling process, and the outline determination process for the reference image of template matching; and
performing template matching between the reference image and the unexcluded candidate image without performing template matching between the reference image and the excluded candidate image.

* * * * *